United States Patent
Bucher

(10) Patent No.: US 9,681,582 B1
(45) Date of Patent: Jun. 13, 2017

(54) PLUGGABLE CONNECTOR AND UNITARY HOUSING SHELL CONFIGURED TO TRANSFER THERMAL ENERGY OF THE PLUGGABLE CONNECTOR

(71) Applicant: TYCO ELECTRONICS CORPORATION, Berwyn, PA (US)

(72) Inventor: Alan Weir Bucher, Manheim, PA (US)

(73) Assignee: TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 14/959,293

(22) Filed: Dec. 4, 2015

(51) Int. Cl.
*H01R 13/00* (2006.01)
*H05K 7/20* (2006.01)
*H01R 13/66* (2006.01)

(52) U.S. Cl.
CPC ......... *H05K 7/2039* (2013.01); *H01R 13/665* (2013.01)

(58) Field of Classification Search
CPC .... H01R 13/533; H01R 12/721; H01R 12/88; H01R 12/724; H01R 13/46; H01R 13/6658
USPC ........................................................ 439/487
See application file for complete search history.

(56) References Cited

U.S. PATENT DOCUMENTS

| | | | |
|---|---|---|---|
| 6,843,606 B2 | 1/2005 | Deane et al. | |
| 7,281,864 B2 * | 10/2007 | Mizue | G02B 6/4292 385/92 |
| 7,539,018 B2 * | 5/2009 | Murr | H05K 7/20418 165/185 |
| 8,057,109 B2 * | 11/2011 | Flens | G02B 6/43 385/88 |
| 9,016,956 B2 | 4/2015 | Wang | |
| 2013/0156418 A1 | 6/2013 | Stapleton et al. | |
| 2014/0079403 A1 | 3/2014 | Daghighian et al. | |
| 2014/0294351 A1 | 10/2014 | Huang et al. | |
| 2015/0003839 A1 | 1/2015 | Minota | |
| 2015/0096732 A1 | 4/2015 | Teo et al. | |

* cited by examiner

*Primary Examiner* — Xuong Chung Trans

(57) ABSTRACT

Pluggable connector includes a connector housing having a unitary housing shell that includes a top wall, a bottom wall that is spaced apart from the top wall, and a side wall that extends between and joins the top and bottom walls. The pluggable connector also includes a communication assembly positioned within an interior cavity of the pluggable connector. The communication assembly includes internal electronics that generate thermal energy during operation. The top wall has an exterior surface that forms an output area configured to dissipate the thermal energy therefrom. The bottom wall has an interior surface that is coupled to the internal electronics such that the thermal energy is conveyed from the internal electronics into the bottom wall. The unitary housing shell forms a seamless thermal-transfer path that extends from the bottom wall, through the side wall, and to the output area.

20 Claims, 5 Drawing Sheets

PLUGGABLE CONNECTOR AND UNITARY HOUSING SHELL CONFIGURED TO TRANSFER THERMAL ENERGY OF THE PLUGGABLE CONNECTOR

BACKGROUND

The subject matter herein relates generally to a pluggable connector that is configured to transfer thermal energy (or heat) generated within the pluggable connector to an exterior of the pluggable connector for dissipation into the surrounding environment.

Pluggable connectors may be used to transmit data and/or electrical power to and from different systems or devices. For example, a cable assembly (or plug assembly) typically includes two or more pluggable connectors that are interconnected through one or more communication cables. Data signals may be transmitted through the communication cable(s) in the form of optical signals and/or electrical signals. Electrical power may also be transmitted through the communication cable(s). Each pluggable connector includes a connector housing having a leading end that is mated with a receptacle assembly and a back end that is coupled to the corresponding communication cable. For some types of pluggable connectors, the pluggable connector includes a circuit board within the connector housing. The circuit board has contact pads that are exposed at the leading end of the connector housing. During a mating operation, the leading end is inserted into a cavity of the receptacle assembly and advanced in a mating direction until the contact pads of the circuit board engage corresponding contacts of a mating connector of the receptacle assembly.

A common challenge that developers of pluggable connectors often confront is heat management. Heat generated by internal electronics within the pluggable connector can degrade performance or even damage the pluggable connector. For example, pluggable connectors may include an electro-optical (E/O) engine that is coupled to an interior circuit board of the pluggable connector. The E/O engine transforms data signals from an electrical form to an optical form or vice versa. This transformation process can generate a substantial amount of heat within the pluggable connector.

To dissipate the heat, the pluggable connector engages a heat sink when the pluggable connector is mated to the receptacle assembly. The heat sink is typically positioned along a top surface of the pluggable connector and is pressed against the top surface to maintain an intimate engagement throughout operation. Heat generated within the pluggable connector is absorbed by the connector housing and transferred along a thermal path to the top surface. Although the thermal path in known pluggable connectors allows heat to transfer to the top surface, it is desirable to improve the efficiency of this transfer so that developers may create other connector configurations and/or increase the throughput of the pluggable connectors.

Accordingly, there is a need for a pluggable connector that provides improved heat transfer while minimizing a likelihood of damage to internal electronics.

BRIEF DESCRIPTION

In an embodiment, a pluggable connector is provided that includes a connector housing having a unitary housing shell that includes a top wall, a bottom wall that is spaced apart from the top wall, and a side wall that extends between and joins the top and bottom walls. The connector housing has an interior cavity that is partially defined by the top wall, the bottom wall, and the side wall. The pluggable connector also includes a communication assembly positioned within the interior cavity. The communication assembly includes internal electronics that generate thermal energy during operation of the pluggable connector. The top wall has an exterior surface that forms an output area configured to dissipate the thermal energy therefrom. The bottom wall has an interior surface that is coupled to the internal electronics such that the thermal energy is conveyed from the internal electronics into the bottom wall. The unitary housing shell forms a seamless thermal-transfer path that extends from the bottom wall, through the side wall, and to the output area.

In some embodiments, the unitary housing shell forms a back side opening that is opposite the bottom wall. Optionally, the communication assembly includes a circuit board that is coupled to the internal electronics. The circuit board may include a plurality of mating terminals that are positioned along a leading edge of the circuit board. The back side opening may be sized and shaped to permit the leading edge of the circuit board to be inserted through the back side opening and positioned adjacent to a leading end of the pluggable connector.

In an embodiment, a connector housing for a pluggable connector is provided that includes a top wall having an exterior surface that includes an output area. The connector housing also includes a bottom wall having an interior surface that is configured to couple to internal electronics of the pluggable connector and absorb thermal energy therefrom. The connector housing also includes a pair of opposing side walls that are each coupled to the top and bottom walls. The top and bottom walls extend between and join the opposing side walls. The top and bottom walls are configured to form at least portions of top and bottom sides, respectively, of the pluggable connector. The top wall, the bottom wall, and the opposing side walls form a unitary housing shell. The unitary housing shell has first and second seamless thermal-transfer paths that extend from the bottom wall to the output area of the top wall. Each of the first and second thermal-transfer paths extends from the bottom wall, through a respective side wall of the pair of opposing side walls, and the top wall.

DETAILED DESCRIPTION

Embodiments set forth herein include plug and receptacle assemblies, plug assemblies, pluggable connectors, connector housings, and unitary housing shells that provide at least one seamless thermal-transfer path. For example, the thermal-transfer path may extend from a first wall where thermal energy is absorbed to an opposite second wall where the thermal energy is dissipated. Because the thermal-transfer path (or paths) are seamless, the thermal energy may be conveyed more quickly and/or more efficiently from the source of the thermal energy.

Figure 1:
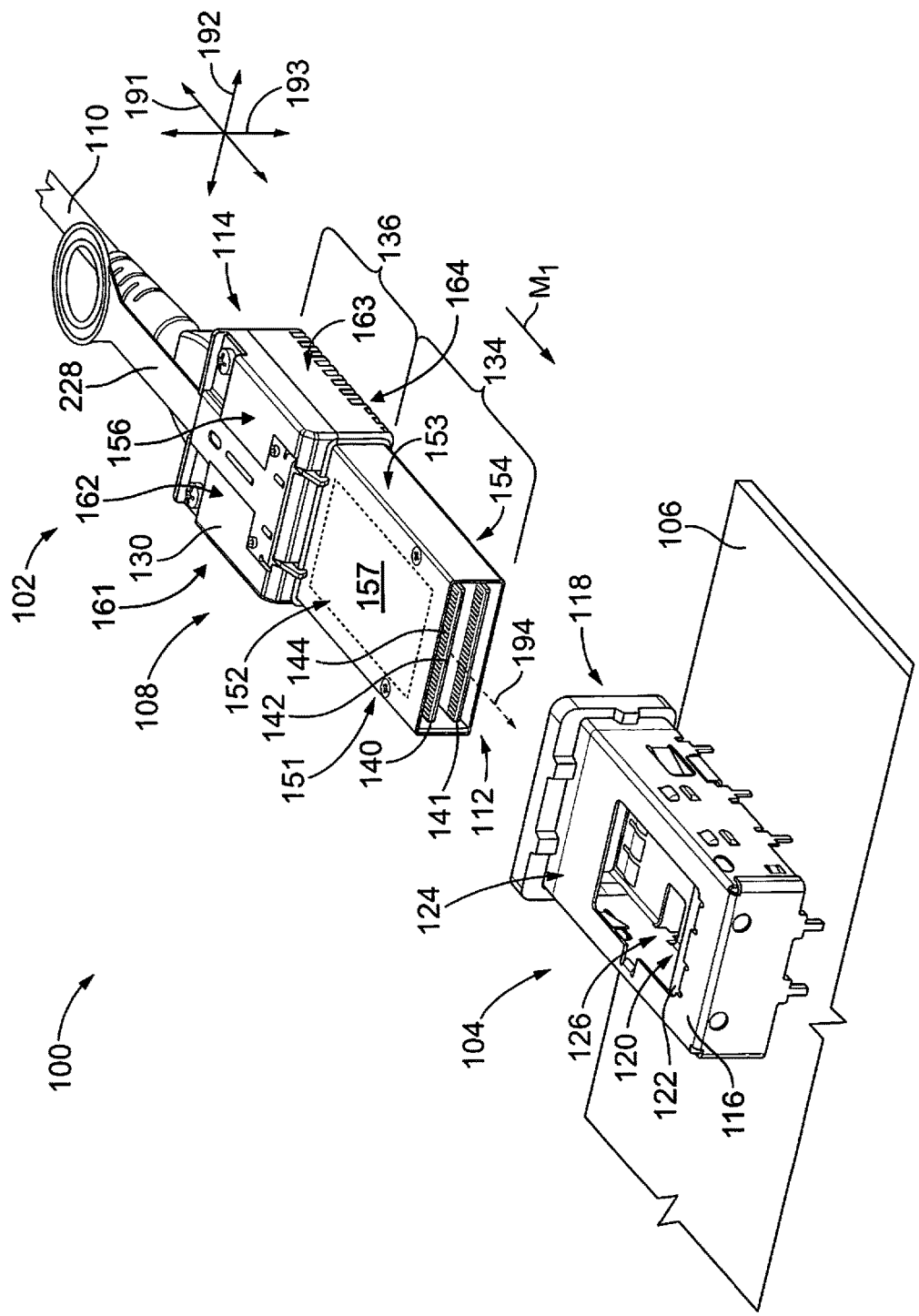
FIG. 1 is a perspective view of a plug and receptacle assembly formed in accordance with an embodiment.

FIG. 1 is a perspective view of a plug and receptacle assembly 100 formed in accordance with an embodiment that includes a plug assembly 102 and a receptacle assembly 104. The plug and receptacle assembly 100 may also be referred to as a communication system, and the plug assembly 102 may also be referred to as a cable assembly. The receptacle assembly 104 is mounted to a circuit board 106. The circuit board 106 may be, for example, a daughter card or a mother board. The plug assembly 102 includes a pluggable connector 108 that is an input/output (I/O) module capable of repeatedly mating with the receptacle assembly 104. In FIG. 1, the plug and receptacle assembly 100 is oriented with respect to mutually perpendicular axes, including a mating axis 191, a lateral axis 192, and an elevation axis 193.

The plug assembly 102 includes a communication cable 110 that is coupled to a trailing end 114 of the pluggable connector 108. The communication cable 110 may be affixed to the trailing end 114 such that the communication cable 110 may not be separated from the pluggable connector 108 without damaging the pluggable connector 108 or the communication cable 110. Alternatively, the communication cable 110 may be readily separable from the trailing end 114. Although not shown, the plug assembly 102 may include another pluggable connector 108 that is attached to an opposite end of the communication cable 110. The pluggable connector 108 has a leading end 112 that is opposite the trailing end 114. A longitudinal axis 194 of the pluggable connector 108 extends between the leading end 112 and the trailing end 114 and is parallel to the mating axis 191.

The receptacle assembly 104 has a receptacle housing 116. In some embodiments, the receptacle housing 116 may be stamped and formed from sheet metal to form a receptacle cage. In other embodiments, the receptacle housing 116 may be formed from other manufacturing methods. The receptacle housing 116 defines a communication port 118 that provides access to a receiving cavity 120 within the receptacle housing 116. The communication port 118 and the receiving cavity 120 are configured to receive a portion of the pluggable connector 108. For example, the leading end 112 of the pluggable connector 108 is configured to be inserted through the communication port 118 and into the receiving cavity 120.

To insert the leading end 112 into the receiving cavity 120, the pluggable connector 108 is aligned with respect to the communication port 118 and the receiving cavity 120 and advanced through the communication port 118 in a mating direction $M_1$. The mating direction $M_1$ is parallel to the mating axis 191. The leading end 112 is advanced toward a mating connector 122 that is disposed within the receiving cavity 120. The pluggable connector 108 and the mating connector 122 form a pluggable engagement.

Optionally, the receptacle assembly 104 includes a thermal-transfer module (not shown), such as a heat sink, that is configured to engage the pluggable connector 108 when the pluggable connector 108 is mated with the receptacle assembly 104 and disposed within the receiving cavity 120. For instance, the receptacle housing 116 has a top side 124 that includes an opening 126 therethrough. In some embodiments, the thermal-transfer module may be mounted to the top side 124 and extend along the opening 126. The thermal-transfer module may have a surface (not shown) that intimately engages the pluggable connector 108 when the pluggable connector 108 is positioned within the receiving cavity 120. As such, the thermal-transfer module may absorb thermal energy generated by the pluggable connector 108. In alternative embodiments, the pluggable connector 108 may be cooled by directing forced air (not shown) across the opening 126.

The communication cable 110 is configured to transmit data signals and, optionally, electrical power. In alternative embodiments, the communication cable 110 may only transmit electrical power. In an exemplary embodiment, the communication cable 110 includes optical fibers that are configured to transmit data signals in the form of optical signals. The optical fibers may be communicatively coupled to internal electronics 320 (shown in FIG. 5) of the pluggable connector 108, such as an electro-optical (E/O) engine, integrated circuits, processing units, or other circuitry. In other embodiments, the communication cable 110 includes insulated wires having jackets that surround wire conductors. The wire conductors may be configured to transmit electrical signals and/or electrical power.

In particular embodiments, the plug and receptacle assembly 100 is a high speed pluggable input/output (I/O) interconnect assembly. The plug and receptacle assembly 100, the plug assembly 102, and/or the pluggable connector 108 may be configured for various applications. Non-limiting examples of such applications include storage networking, cluster computing, high performance computing, and telecommunications. The plug and receptacle assembly 100, the plug assembly 102, and/or the pluggable connector 108 may be used with switches, hubs, storage systems, storage devices, adapters, controllers, network interface cards (NICs), servers, switches, host bus adapters (HBAs), and routers. By way of one example, the pluggable connector 108 and/or the receptacle assembly 104 may be part of a quad small form-factor pluggable (QSFP) interconnect system, such as the QSFP+ system available from TE Connectivity. As another example, the pluggable connector 108 and/or the receptacle assembly 104 may be part of a CDFP interconnect system, which is a standard developed through a multi-source agreement. The plug and receptacle assembly 100 may be capable of achieving high data rates, such as data rates that exceed 20 gigabits per second (Gbps), 50 Gbps, 100 Gbps, or more. The plug and receptacle assembly 100 may also be configured to satisfy various industry standards, such as Ethernet, Fibre Channel, and InfiniBand. In other embodiments, the plug and receptacle assembly 100 may transmit data at slower speeds.

The pluggable connector 108 has a connector housing 130 that includes the leading end 112 and the trailing end 114. When the connector housing 130 is fully assembled (as shown in FIG. 1 or FIG. 6), the connector housing 130 encloses an interior cavity 304 (shown in FIG. 5) where the internal electronics 320 (FIG. 5) are located. The interior cavity 304 extends between the leading end 112 and the trailing end 114 and may open to the leading end 112. The connector housing 130 has a plug section or portion 134 that is sized and shaped to be inserted through the communication port 118 and into the receiving cavity 120 of the receptacle assembly 104. The connector housing 130 also includes a body section or portion 136 that is not inserted into the receiving cavity 120. The plug section 134 includes the leading end 112. The body section 136 includes the trailing end 114 and may be configured to be gripped by an individual.

In an exemplary embodiment, the body section 136 includes at least a portion of the internal electronics 320.

Alternatively or in addition to the internal electronics 320 being within the body section 136, the plug section 134 may include at least a portion of the internal electronics 320. The connector housing 130 has an exterior surface 156 that includes a designated area 157, which is hereinafter referred to as an output area or engagement area. The output area 157 is configured to align with the opening 126 and, optionally, engage the thermal-transfer module. As described herein, the connector housing 130 forms a seamless thermal-transfer path that conveys thermal energy generated through the connector housing 130 to the output area 157.

The pluggable connector 108 includes a pair of circuit boards 140, 141 that each have a leading edge 142 with mating terminals 144. The circuit boards 140, 141 may coincide with respective planes that extend parallel to the mating and lateral axes 191, 192. In alternative embodiments, the pluggable connector 108 may have only one circuit board or may not include a circuit board. In an exemplary embodiment, the mating terminals 144 are electrical contacts or, more specifically, contact pads. The circuit boards 140, 141 are disposed within the interior cavity 304 (FIG. 5) and exposed at the leading end 112. The mating terminals 144 are configured to engage corresponding terminals (not shown) of the mating connector 122 in the receptacle assembly 104. The mating terminals 144 may be other types of electrical contacts, such as contact beams, in other embodiments.

The plug section 134 of the connector housing 130 includes plug sides 151, 152, 153, 154 that extend parallel to the longitudinal axis 194 (or the mating axis 191) and between the leading end 112 and the body section 136. The plug sides 151, 153 face in opposite directions along the lateral axis 192 and extend lengthwise along the longitudinal axis 194 (or the mating axis 191) between the body section 136 and the leading end 112. The plug sides 152, 154 face in opposite directions along the elevation axis 193 and extend lengthwise along the longitudinal axis 194 (or the mating axis 191) between the body section 136 and the leading end 112. The plug sides 152, 154 extend laterally between the plug sides 151, 153. When the pluggable connector 108 is mated with the receptacle assembly 104, the thermal-transfer module (not shown) of the receptacle assembly 104 may engage the output area 157 of the exterior surface 156 along the plug side 152.

The body section 136 of the connector housing 130 includes body sides 161, 162, 163, 164 that extend parallel to the longitudinal axis 194 (or the mating axis 191) and between the trailing end 114 and the plug section 134. The body sides 161, 163 face in opposite directions along the lateral axis 192 and extend lengthwise along the longitudinal axis 194 (or the mating axis 191) between the trailing end 114 and the plug section 134. The body sides 162, 164 face in opposite directions along the elevation axis 193 and extend lengthwise along the longitudinal axis 194 (or the mating axis 191) between the trailing end 114 and the plug section 134. The body sides 162, 164 extend laterally between the body sides 161, 163.

Although the elevation axis 193 appears to extend parallel to the force of gravity in FIG. 1 with gravity pulling the receptacle assembly 104 toward the circuit board 106, it should be understood that the plug and receptacle assembly 100 and its components may have other spatial orientations. For example, the lateral axis 192 may extend parallel to the force of gravity. Although spatially relative terms, such as "top" "bottom," "front," and "back" may be used in the description and claims for describing a spatial relationship between two elements or features, it should be understood that such terms do not require a particular orientation for the pluggable connector 108 or the assembly 100. For example, a top wall may be located below a bottom wall, with respect to gravity, depending on the orientation of the component.

As used herein, the terms "front," "forward," "forwardly," and derivatives thereof refer to a direction defined by a vector extending from the trailing end 114 toward the leading end 112. Conversely, the terms "back," "rearward," "rearwardly," and derivatives thereof refer to a direction that is opposite the forward direction. The rearward direction is defined by a vector that extends away from the leading end 112 toward the trailing end 114. The terms "lateral," "laterally," and derivatives thereof refer to a direction that is generally parallel with the plane defined by the circuit board 106 or a plane that is parallel to the mating and lateral axes 191, 192.

Figure 2:
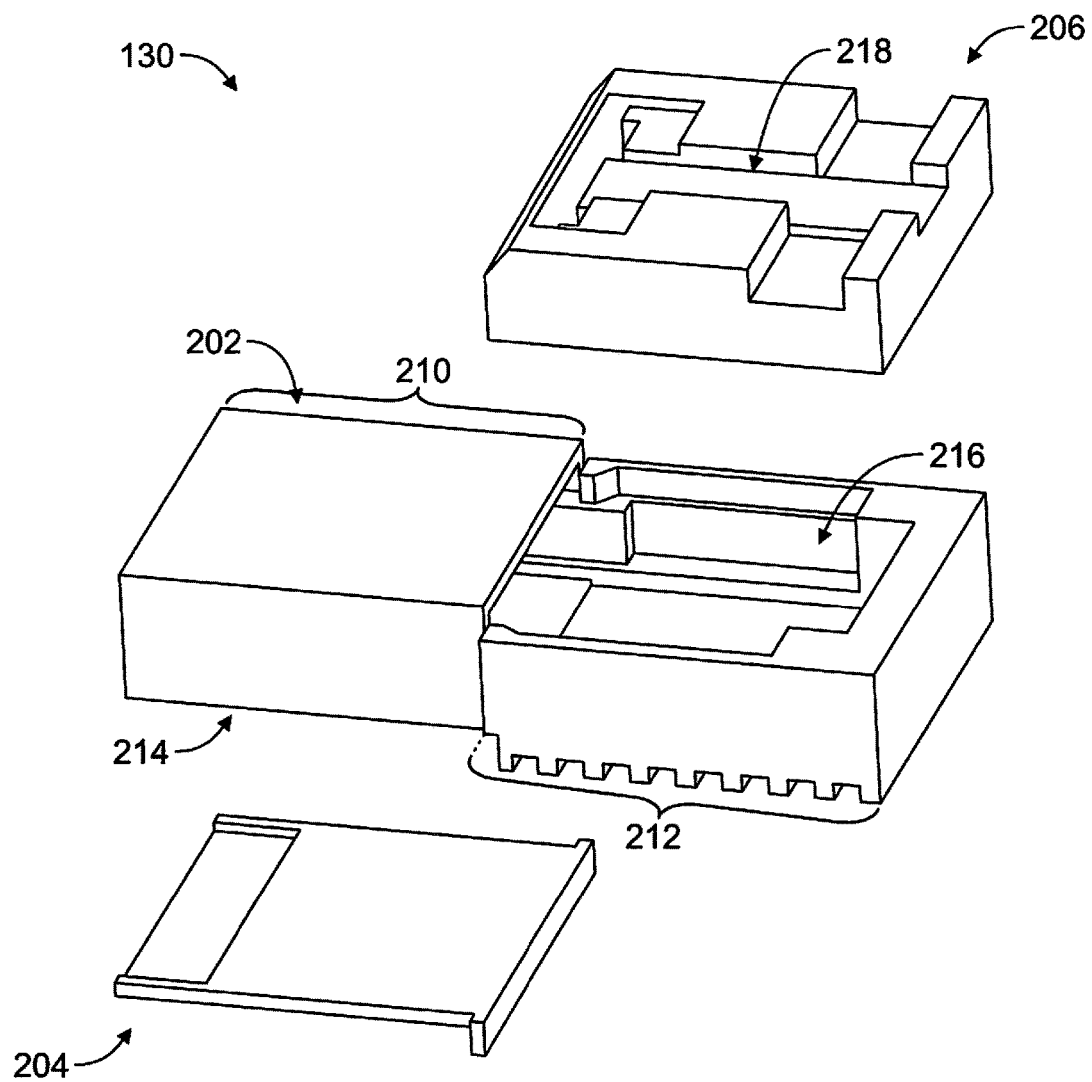
FIG. 2 is an exploded view of a connector housing that may be used in assembling a pluggable connector in accordance with an embodiment.

FIG. 2 is an exploded view of the connector housing 130. In the illustrated embodiment, the connector housing 130 includes a unitary housing shell 202, a front or first cover 204, and a back or second cover 206. In other embodiments, the connector housing 130 may include a unitary housing shell and only one of the front or back covers 204, 206 or a different cover. Yet in other embodiments, the connector housing 130 only includes a unitary housing shell 202. The unitary housing shell 202 is now hereinafter referred to simply as the "housing shell."

The housing shell 202 includes a leading shell section 210 and a trailing shell section 212 that are coupled to each other. The leading shell section 210 includes a front side opening 214, and the trailing shell section 212 includes a back side opening 216. The front cover 204 is configured to be coupled to the housing shell 202 and cover the front side opening 214. The back cover 206 is configured to be coupled to the housing shell 202 and cover the back side opening 216.

The front and back covers 204, 206 may be secured to the housing shell 202 in fixed positions. For example, an adhesive may be positioned along an interface or seam that is defined between the housing shell 202 and the respective cover. The front and back covers 204, 206 may also form an interference fit (e.g., snap fit) with the housing shell 202. When the connector housing 130 is fully assembled (as shown in FIG. 1 and FIG. 6), the connector housing 130 encloses the interior cavity 304 (FIG. 5), except for a cavity opening 236 (shown in FIG. 5) where the mating terminals 144 are disposed.

The housing shell 202 is a unitary structure that provides a seamless thermal-transfer path as described herein. The unitary structure constitutes a single element or part of the pluggable connector 108 (FIG. 1). The unitary structure does not include multiple discrete parts that are affixed to each other and form joints or seams therebetween. More specifically, it is not necessary for the seamless thermal-transfer path to cross an interface between discrete structures of the same or different material. By way of example, the housing shell 202 may be molded, die-cast, machined, or stamped-and-formed from a thermally conductive material (e.g., metal material). The thermally conductive material may include, for example, zinc, aluminum, and copper. The front and back covers 204, 206 are discrete components and may be formed from the same material or from a different material.

In the illustrated embodiment, the housing shell 202 constitutes a majority of the connector housing 130 and includes a majority of an exterior of the connector housing 130. When the connector housing 130 is formed, the exterior of the front and back covers 204, 206 form respective portions of the exterior surface 156 of the connector housing 130. In other embodiments, however, the housing shell 202 may not form a majority of the connector housing and/or may not include a majority of the exterior surface 156.

Also shown in FIG. 2, the back cover 206 includes a recess 218 that opens to the exterior of the connector housing 130. The recess 218 is sized and shaped to receive a tether or pull tab 228 (shown in FIG. 1). Although not shown, the tether 228 may be operably coupled to a release mechanism for disconnecting the pluggable connector 108 (FIG. 1) and the receptacle assembly 104 (FIG. 1).

Figure 3:
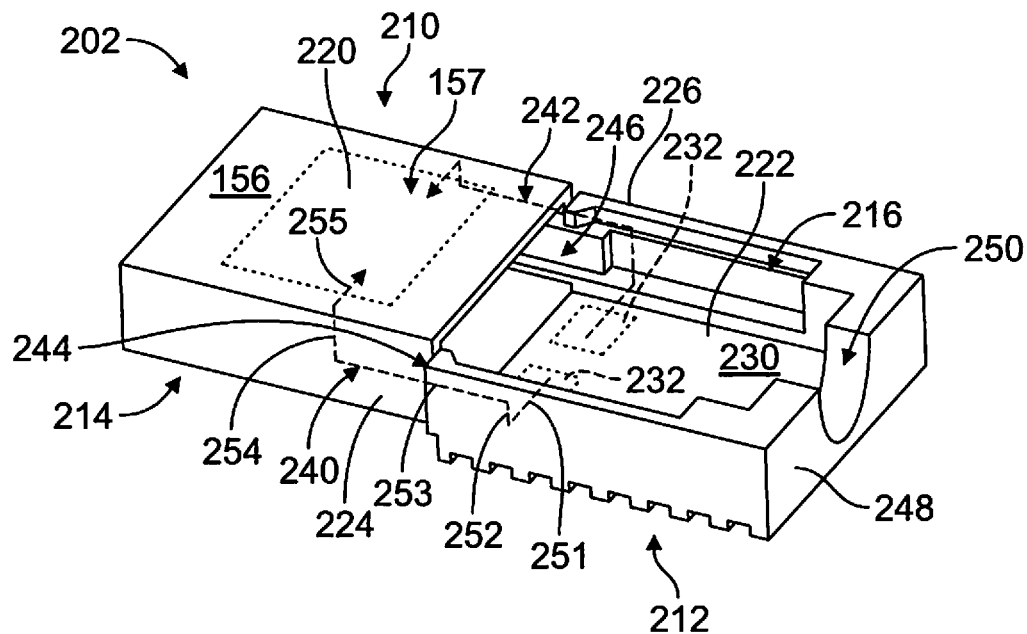
FIG. 3 is an isolated top perspective view of a unitary housing shell in accordance with an embodiment that is a part of the connector housing of FIG. 2.
Figure 4:
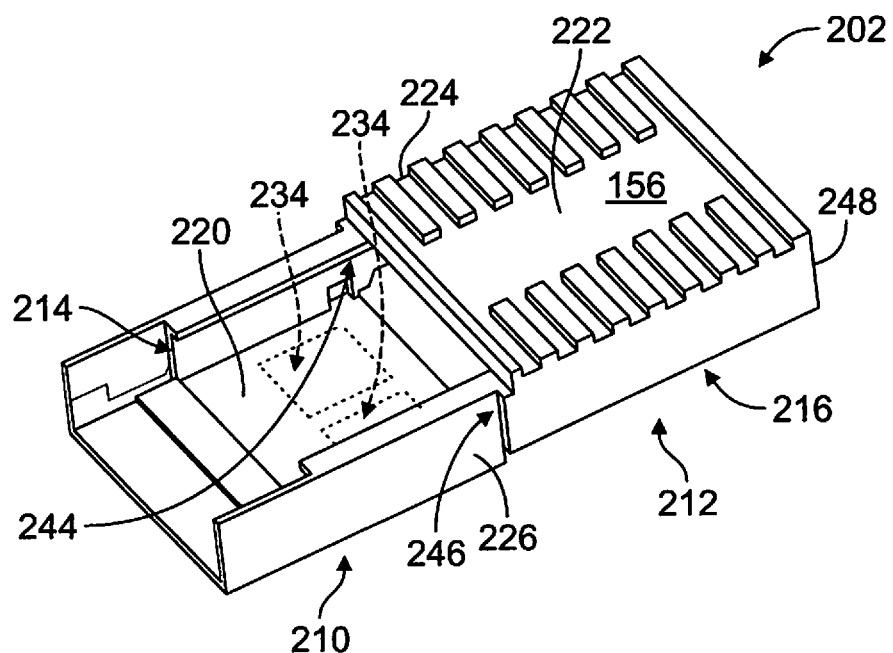
FIG. 4 is an isolated bottom perspective view of the unitary housing shell.

FIGS. 3 and 4 illustrate top and bottom isolated perspective views of the housing shell 202. The housing shell 202 includes a top wall 220, a bottom wall 222, and a pair of opposing side walls 224, 226, which may also be referred to as first and second side walls 224, 226. In some embodiments, the housing shell 202 includes only one of the side walls 224, 226.

In the illustrated embodiment, the top wall 220 forms the plug side 152 (FIG. 1) of the plug section 134 (FIG. 1) and includes the output area 157 of the exterior surface 156. In FIGS. 3 and 4, the exterior surface 156 is shown along the housing shell 202. It should be understood that the exterior surface 156 may include portions of the front and back covers 204, 206 (FIG. 2). The bottom wall 222 forms the body side 164 (FIG. 1) of the body section 136 (FIG. 1). The housing shell 202 includes an interior surface 230. Similar to the exterior surface 156, the interior surface 230 may be formed by the housing shell 202 and surfaces of the front and back covers 204, 206.

As shown in FIG. 3, the bottom wall 222 includes one or more input areas 232 of the interior surface 230. Each of the input areas 232 represents a portion of the interior surface 230 that couples to internal electronics 320 as described below. In addition to the input area 232, the interior surface 230 along the top wall 220 may include one or more input areas 234 (FIG. 4) that are configured to couple to internal electronics 320.

The leading shell section 210 is formed by the top wall 220 and forward portions of the side walls 224, 226. The trailing shell section 212 is formed by the bottom wall 222 and rearward portions of the side walls 224, 226. Each of the side walls 224, 226 extends between and joins the top and bottom walls 220, 222. As such, each of the leading shell section 210 and the trailing shell section 212 are defined by portions of the side walls 224, 226. The leading and trailing shell sections 210, 212 are coupled to each other at joint regions 244 and 246. The side wall 224 includes the joint region 244, and the side wall 226 includes the joint region 246. The back side opening 216 is adjacent to the top wall 220 and opposite the input area(s) 232 such that the input area(s) 232 face the back side opening 216. The front side opening 214 is adjacent to the bottom wall 222 and opposite the input area(s) 234 such that the input area(s) 234 face the front side opening 214.

Optionally, the trailing shell section 212 may include a trailing or rearward wall 248. The trailing wall 248 may include or define the trailing end 114 (FIG. 1) of the pluggable connector 108 (FIG. 1). The trailing wall 248 forms a portion of the housing shell 202. In other embodiments, however, the trailing wall 248 may be a separable wall or a cover that is coupled to the housing shell 202. In other embodiments, the trailing wall 248 may form a portion of the back cover 206 (FIG. 2). As shown, the trailing wall 248 may include a cable opening (e.g., slot) 250 that is sized and shape to receive the communication cable 110. Yet in other embodiments, the trailing wall is not used and the communication cable 110 (FIG. 1) includes a boot that encloses the interior cavity.

With respect to FIG. 3, embodiments may form first and second seamless thermal-transfer paths 240, 242 (indicated by dashed lines) that extend from one or more of the input areas 232 of the bottom wall 222 to the output area 157 of the top wall 220. The thermal energy may be absorbed from the internal electronics 320 (FIG. 5) and transferred through the housing shell 202 to the output area 157. More specifically, the first seamless thermal-transfer path 240 extends through the bottom wall 222, the side wall 224, and the top wall 220. The second seamless thermal-transfer path 242 extends through the bottom wall 222, the side wall 226, and the top wall 220. The output area 157 represents the portion of the exterior surface 156 that aligns with the opening 126 (FIG. 1) of the receptacle assembly 104 (FIG. 1). In FIG. 3, the output area 157 appears as only one surface area. In other embodiments, however, the output area 157 may include separate surface areas.

The first and second thermal-transfer paths 240, 242 through the housing shell 202 are devoid of material discontinuities in which the thermal energy must cross or traverse a seam between discrete components. A seam may include, for example, an interface between two discrete components that abut each other or an interface between two discrete components that are joined through an adhesive or other intervening material (e.g., foam).

As indicated by the dashed lines in FIG. 3, each of the thermal-transfer paths 240, 242 may include a first lateral component 251, a first vertical component 252, a longitudinal component 253, a second vertical component 254, and a second lateral component 255. It should be understood that the transfer of heat from the input area(s) 232 to the output area 157 is not a single narrow path but a general conduction or conveyance of the thermal energy that is directed through the material of the housing shell 202 from the input area(s) 232 to the output area 157. The direction of the conduction is determined by, at least in part, the location and size of the input area(s) 232, the location and size of the output area 157, and the shape of the housing shell 202. Nonetheless, the general conduction includes the directional components 251-255. The longitudinal components 253 are forward components that extend along the side walls 224, 226 and, in particular, through the joint regions 244, 246, respectively, that join the leading shell section 210 and the trailing shell section 212.

It is noted that the thermal-transfer paths 240, 242 do not exclude the possibility of some thermal energy being transferred across seams or interfaces. For example, thermal energy may traverse a seam 330 (shown in FIG. 6) between the front cover 204 (FIG. 2) and the housing shell 202 and/or a seam 332 (shown in FIG. 6) between the back cover 206 (FIG. 2) and the housing shell 202. Nonetheless, a substantial amount of the thermal energy that is dissipated through the output area 157 may be transferred through one or more of the thermal-transfer paths 240, 242. In some embodiments, at least 30% of the thermal energy that is dissipated through the output area 157 may be transferred through the thermal-transfer paths 240, 242. In particular embodiments, a majority of the thermal energy (e.g., at least 50%) that is dissipated through the output area 157 may be transferred through the thermal-transfer paths 240, 242. In more particular embodiments, at least 75% of the thermal energy that is dissipated through the output area 157 may be transferred through the thermal-transfer paths 240, 242. However, unless recited otherwise, embodiments set forth herein and in the claims are not limited to particular percentage. In some embodiments, a nominal or insubstantial amount of the thermal energy that is dissipated through the output area 157 is transferred through the seams 330, 332. Determination of the path(s) taken by thermal energy that is dissipated through the output area 157 may be made through simulation or direct testing (e.g., thermal imaging).

Figure 5:
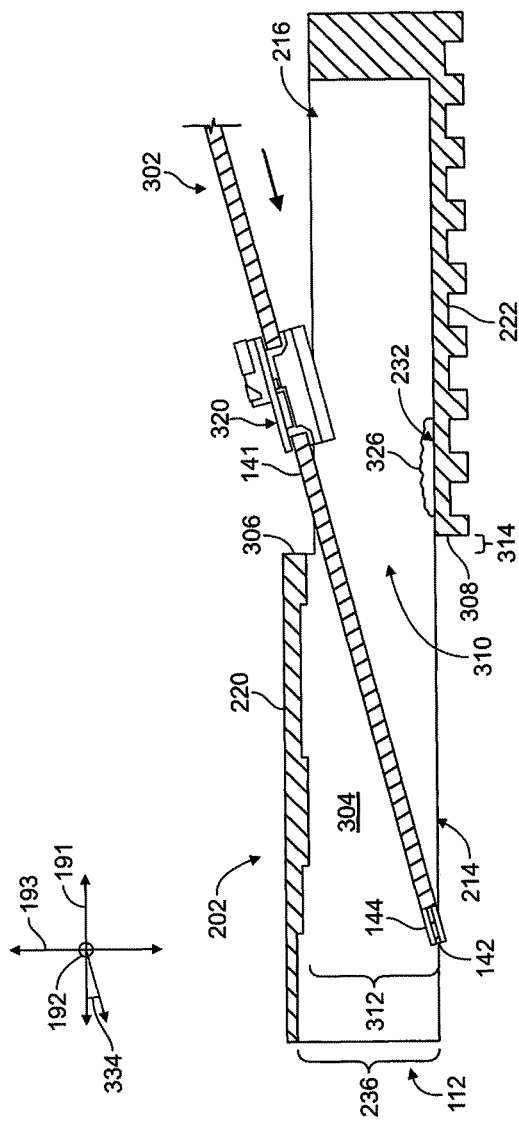
FIG. 5 illustrates a side cross-section of the unitary housing shell during an assembly process.
Figure 6:
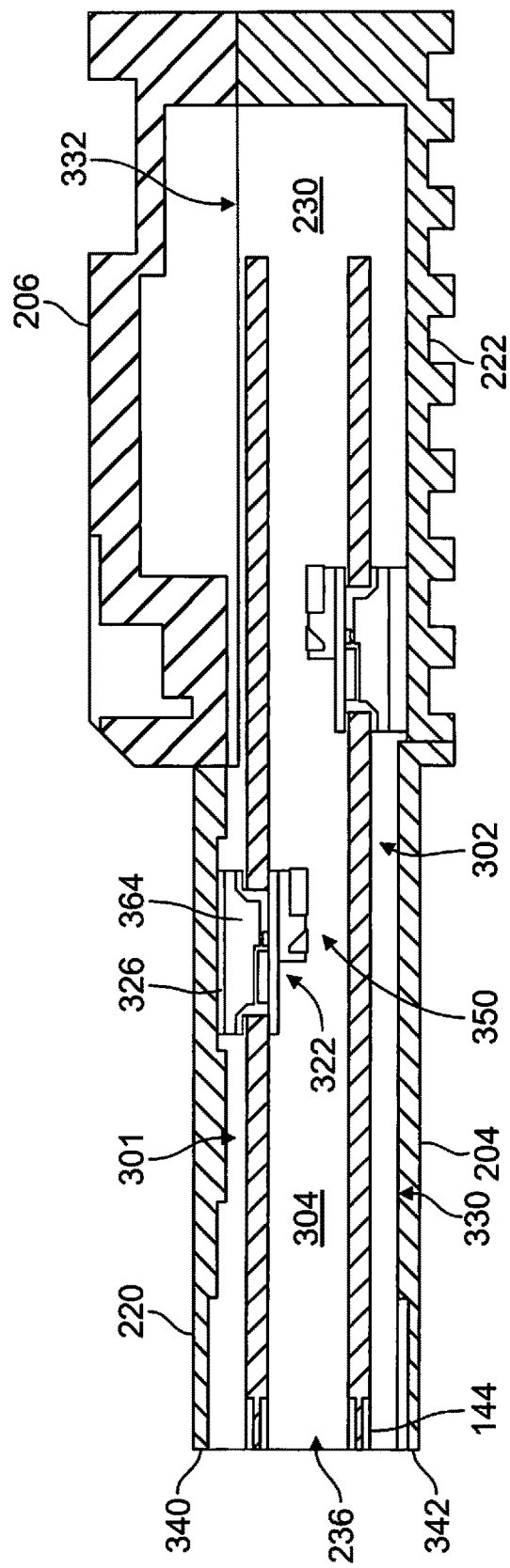
FIG. 6 illustrates a side cross-section of a fully assembled pluggable connector in accordance with an embodiment that includes the connector housing of FIG. 2.

FIG. 5 illustrates a side cross-section of the housing shell 202 during an assembly process in which the communication assembly 302 is inserted into the interior cavity 304. As shown, the communication assembly 302 includes the circuit board 141 and the internal electronics 320. Although not shown, the internal electronics 320 may be communicatively coupled to optical fibers and/or electrical conductors of the communication cable 110 (FIG. 1). The internal electronics 320 are, in turn, communicatively coupled to the mating terminals 144. The internal electronics 320 may include electrical and/or optical circuits through which current or light propagates. The internal electronics 320 may generate a substantial amount of heat during operation of the pluggable connector 108.

In some embodiments, the front and back side openings 214, 216 are sized and shaped relative to each other to permit the insertion of the communication assembly 302 (and the communication assembly 301 shown in FIG. 6) into the interior cavity 304. For example, the communication assembly 302 may be inserted through the back side opening 216 into the interior cavity 304 and toward the cavity opening 236. Accordingly, the communication assembly 302 may be inserted in a generally forward direction. In other embodiments, one or more of the communication assemblies 301, 302 may be led through the front side opening 214. In such embodiments, the communication assemblies 301, 302 may be inserted in a generally rearward direction.

With respect to the illustrated embodiment, the leading edge 142 of the circuit board 141 is advanced through the back side opening 216 and generally toward the leading end 112 at a non-orthogonal angle 334. As shown, the top wall 220 has an inner wall edge 306 that defines a portion of the back side opening 216, and the bottom wall 222 has an inner wall edge 308 that defines a portion of the front side opening 214. The inner wall edges 306, 308 are separated by a working gap 310 that includes a vertical component 312 and a longitudinal component 314. The vertical and longitudinal components 312, 314 may be measured along the elevation axis 193 and the longitudinal axis 194, respectively. As such, the inner wall edges 306, 308 have different axial locations relative to the mating axis 191 (or the longitudinal axis 194 (FIG. 1)). In some embodiments, the axial locations are spaced apart such that the top and bottom walls 220, 222 do not overlap each other. In other embodiments, however, the top and bottom walls 220, 222 may at least partially overlap each other or the inner wall edges 306, 308 may align with each other.

The working gap 310 or, more specifically, the vertical and longitudinal components 312, 314 are configured to permit the communication assembly 302 to be inserted through the working gap 310 such that the circuit board 141 has a non-orthogonal orientation with respect to the elevation axis 193 and the longitudinal axis 194. The front side opening 214 is configured to permit a portion of the circuit board 141 to extend therethrough. The working gap 310 is also configured to permit the circuit board 141 to be rotated within the interior cavity 304 so that the internal electronics 320 may couple to the input area 232. More specifically, the circuit board 141 may be rotated about an axis of rotation that extends parallel to the lateral axis 192. The circuit board 141 may be rotated toward the input area 232 of the bottom wall 222.

In particular embodiments, the internal electronics 320 may engage a thermally-conductive substance 326 that secures the internal electronics 320 to the input area 232. The thermally-conductive substance 326 may be, for example, an adhesive, a putty, an underfill, and/or an encapsulant. It is noted that these terms (i.e., adhesive, putty, underfill, encapsulant) are not necessarily mutually exclusive. The thermally-conductive substance 326 may include, for example, thermally-conductive particles (e.g., metal particles) that are dispersed within a compliant material (e.g., silicone) that permits the thermally-conductive substance 326 to be molded or pressed into a desired shape. By permitting the circuit board 141 to be positioned within the interior cavity 304 and rotated toward the input area 232, the internal electronics 320 may be pressed into the thermally-conductive substance 326. In some embodiments, the thermally-conductive substance 326 may be actively cured or allowed to passively cure.

FIG. 6 illustrates a side cross-section of the pluggable connector 108. As shown, the communication assemblies 301, 302 have been operably positioned within the interior cavity 304. The interior cavity 304 is define by the interior surface 230, which includes surfaces of the housing shell 202, the front cover 204, and the back cover 206. As shown, the front cover 204 has been coupled to the housing shell 202 such that the front cover 204 covers the front side opening 214. The front cover 204 opposes the top wall 220 with the interior cavity 304 therebetween. The back cover 206 has been coupled to the housing shell 202 such that the back cover 206 covers the back side opening 216. The back cover 206 opposes the bottom wall 222 with the interior cavity 304 therebetween.

The cavity opening 236 is defined by a front edge 340 of the housing shell 202 and a front edge 342 of the front cover 204. The front edge 340 may be substantially three-sided and the front edge 342 may close the three sides. The mating terminals 144 are positioned proximate to the lead end 112. For example, the mating terminals 144 may be located at the cavity opening 236, positioned a nominal depth within the interior cavity 304, or clear the front edge 340 such that the mating terminals 144 are positioned a nominal distance away from the cavity opening 236.

The internal electronics 320 of the communication assembly 301 and the internal electronics 320 of the communication assembly 302 have been secured to the respective input areas 234, 232. In the illustrated embodiment, the internal electronics 320 are thermally coupled to the respective wall through a thermal bridge 364 and the thermally-conductive substance 326. For example, the thermal bridge 364 may comprise a substantially single material that efficiently transfers heat. Accordingly, the top and bottom walls 220, 222 may not directly engage the internal electronics 320. Nonetheless, thermal energy generated may be conveyed from the internal electronics 320 to the respective wall and, more specifically, at the respective input area.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The patentable scope should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A pluggable connector comprising:
a connector housing having a unitary housing shell that includes a top wall, a bottom wall that is spaced apart from the top wall, and a side wall that extends between and joins the top and bottom walls, the connector housing having an interior cavity that is partially defined by the top wall, the bottom wall, and the side wall; and
a communication assembly positioned within the interior cavity, the communication assembly including internal electronics that generate thermal energy during operation of the pluggable connector;
wherein the top wall has an exterior surface that forms an output area configured to dissipate the thermal energy therefrom, the bottom wall having an interior surface that is coupled to the internal electronics such that the thermal energy is conveyed from the internal electronics into the bottom wall, wherein the unitary housing shell forms a seamless thermal-transfer path that extends from the bottom wall, through the side wall, and to the output area.

2. The pluggable connector of claim 1, wherein the unitary housing shell forms a back side opening that is opposite the bottom wall, the back side opening being adjacent to the top wall and positioned between the top wall and a trailing end of the pluggable connector.

3. The pluggable connector of claim 2, wherein the communication assembly includes a circuit board that is coupled to the internal electronics, the circuit board including a plurality of mating terminals that are positioned along a leading edge of the circuit board, wherein the back side opening is sized and shaped to permit the leading edge of the circuit board to be inserted through the back side opening and positioned adjacent to a leading end of the pluggable connector.

4. The pluggable connector of claim 3, wherein the trailing end is opposite the leading end and has a cable opening, the pluggable connector further comprising a communication cable that is received through the cable opening at the trailing end.

5. The pluggable connector of claim 3, further comprising a back cover that is coupled to the unitary housing shell and covers the back side opening, the back cover opposing the bottom wall with a portion of the interior cavity therebetween.

6. The pluggable connector of claim 1, wherein the pluggable connector has a leading end that includes a cavity opening, wherein the unitary housing shell forms a front side opening that is positioned between the cavity opening and the bottom wall.

7. The pluggable connector of claim 6, further comprising a front cover that is coupled to the unitary housing shell and covers the front side opening, the front cover opposing the top wall with a portion of the interior cavity therebetween.

8. The pluggable connector of claim 1, wherein the side wall is a first side wall and the thermal-transfer path is a first thermal-transfer path, the unitary housing shell including a second side wall that opposes the first side wall with at least a portion of the interior cavity therebetween, the top and bottom walls extending between and joining the first and second side walls, wherein the unitary housing shell forms a second seamless thermal-transfer path that extends from the bottom wall, through the second side wall, and to the output area.

9. The pluggable connector of claim 1, wherein the top wall has an inner wall edge and the bottom wall has an inner wall edge, the inner wall edges of the top and bottom walls having different axial locations relative to a longitudinal axis that extends between leading and trailing ends of the pluggable connector, wherein the exterior surface is an exterior surface of the connector housing, the bottom wall including a portion of the exterior surface.

10. The pluggable connector of claim 1, wherein the unitary housing shell has a leading shell section that includes the top wall and a trailing shell section that includes the bottom wall, the leading shell section defining a front side opening that is opposite the top wall, the trailing shell section defining a back side opening that is opposite the bottom wall, the connector housing further comprising a front cover and a back cover that cover the front and back side openings, respectively.

11. The pluggable connector of claim 1, wherein the unitary housing shell includes a majority of an exterior of the connector housing.

12. The pluggable connector of claim 1, wherein the internal electronics include an electro-optical engine.

13. A connector housing for a pluggable connector, the connector housing comprising:
a top wall having an exterior surface that includes an output area;
a bottom wall having an interior surface that is configured to couple to internal electronics of the pluggable connector and absorb thermal energy therefrom; and
a pair of opposing side walls that are each coupled to the top and bottom walls, the top and bottom walls extending between and joining the opposing side walls, wherein the top and bottom walls are configured to form at least portions of top and bottom sides, respectively, of the pluggable connector;
wherein the top wall, the bottom wall, and the opposing side walls form a unitary housing shell, the unitary housing shell having first and second seamless thermal-transfer paths that extend from the bottom wall to the output area of the top wall, each of the first and second thermal-transfer paths extending from the bottom wall, through a respective side wall of the pair of opposing side walls, and the top wall.

14. The connector housing of claim 13, wherein the unitary housing shell forms a back side opening that is opposite the bottom wall, the back side opening being adjacent to the top wall and positioned between the top wall and a trailing end of the connector housing.

15. The connector housing of claim 14, wherein the back side opening is sized and shaped to permit a leading edge of a circuit board to be inserted through the back side opening.

16. The connector housing of claim 14, further comprising a back cover that is coupled to the unitary housing shell and covers the back side opening, the back cover opposing the bottom wall with a portion of the interior cavity therebetween.

17. The connector housing of claim 13, wherein the first and second thermal-transfer paths are symmetrical paths that surround the interior cavity.

18. The connector housing of claim 13, wherein the top wall has an inner wall edge and the bottom wall has an inner wall edge, the inner wall edges of the top and bottom walls having different axial locations relative to a longitudinal axis that extends between leading and trailing ends of the pluggable connector, wherein the exterior surface is an exterior surface of the connector housing, the bottom wall including a portion of the exterior surface.

19. The connector housing of claim 13, wherein the unitary housing shell has a leading shell section that includes the top wall and a trailing shell section that includes the bottom wall, the leading shell section defining a front side opening that is opposite the top wall, the trailing shell section defining a back side opening that is opposite the bottom wall, the connector housing further comprising a front cover and a back cover that cover the front and back side openings, respectively.

20. The connector housing of claim 13, wherein a longitudinal axis extends between leading and trailing ends of the pluggable connector when constructed, each of the first and second thermal-transfer paths including a longitudinal component that extends parallel to the longitudinal axis.

* * * * *